(12) United States Patent
Parris

(10) Patent No.: US 12,098,262 B2
(45) Date of Patent: Sep. 24, 2024

(54) METHOD OF VISUALIZING, MONITORING POLYMERIZATION, AND ISOLATING PLASTIC PRODUCT PRODUCED BY POLYMERIZATION OF RESIN WITH PROTON BEAMS

(71) Applicant: George Edward Parris, Gaithersburg, MD (US)

(72) Inventor: George Edward Parris, Gaithersburg, MD (US)

( * ) Notice: Subject to any disclaimer, the term of this patent is extended or adjusted under 35 U.S.C. 154(b) by 0 days.

(21) Appl. No.: 17/933,132

(22) Filed: Sep. 19, 2022

(65) Prior Publication Data
US 2023/0265262 A1    Aug. 24, 2023

Related U.S. Application Data

(60) Provisional application No. 63/323,431, filed on Mar. 24, 2022, provisional application No. 63/312,775, filed on Feb. 22, 2022.

(51) Int. Cl.
| | |
|---|---|
| *C08F 2/46* | (2006.01) |
| *C08F 2/50* | (2006.01) |
| *C08G 61/04* | (2006.01) |
| *C08K 3/30* | (2006.01) |

(52) U.S. Cl.
CPC ........ *C08K 3/30* (2013.01); *C08K 2003/3036* (2013.01)

(58) Field of Classification Search
CPC ..... C08K 3/30; C08K 2003/3036; C08F 2/46; C08F 2/50; C08G 61/04

USPC .................................................. 522/1; 520/1
See application file for complete search history.

(56) References Cited

U.S. PATENT DOCUMENTS 4,258,123 A * 3/1981 Nagashima ........... G03F 7/0295
430/920

FOREIGN PATENT DOCUMENTS

WO    WO-2004017095 A2 *  2/2004  ............ C09K 11/06

* cited by examiner

*Primary Examiner* — Jessica Whiteley
(74) *Attorney, Agent, or Firm* — Ingenium Patents LLC; Peter R Kramer

(57) ABSTRACT

A method for isolating plastic products produced by polymerization of resin with proton beams is disclosed. The method comprises a liquid resin added with a reactive dye that changes from transparent or colorless to color when activated by the proton beam or the chemical polymerization process to reveal polymerization within a polymerizable resin. The change in color is correlated to the energy delivered to the resin by a proton beam, electromagnetic radiation, or heat. The reactive dye is placed into a plastic container. The proton beam is directed into the container to polymerize the resin. When irradiation is complete, the container of frozen resin is opened at the top and bottom and placed on top of the column of water containing a density gradient provided by dissolved salt. The partially cured product is fully cured while suspended in the density gradient by application of heat or ultraviolet radiation.

3 Claims, 4 Drawing Sheets

METHOD OF VISUALIZING, MONITORING POLYMERIZATION, AND ISOLATING PLASTIC PRODUCT PRODUCED BY POLYMERIZATION OF RESIN WITH PROTON BEAMS

CROSS-REFERENCE TO RELATED APPLICATIONS

This non-provisional patent application claims benefit of the filing dates of U.S. provisional patent application 63/312,775 filed on Feb. 22, 2022 and U.S. provisional patent application 63/323,431 filed on Apr. 4, 2022. The contents of provisional applications 63/312,775 and 63/323,431 are hereby incorporated by reference. The contents of non-provisional application Ser. No. 16/350,502 filed Nov. 26, 2018 and Ser. No. 15/927,407 filed Mar. 21, 2018 are hereby incorporated by reference.

TECHNICAL FIELD

The present invention generally relates to a method for isolating plastics. More specifically, the present invention relates to a method of isolating plastic products produced by the polymerization of resin with proton beams. Further, the present invention relates to a method for isolating plastic parts formed in situ of the liquid resin by introducing a dense immiscible liquid to displace the residual liquid resin.

BACKGROUND

Organic polymers are frequently transparent and have refractive indices very similar to the resins (organic oligomers) from which they were derived. This has not been an issue in conventional molding, casting, or three-dimensional printing techniques, because the location of the product is determined by observable objects that are used to create it. In the case of polymers cured by proton beams, the product is immersed in the oligomeric resin and typically is often visually indetectable within the residual liquid resin. This makes it very hard to judge the degree of polymerization and assess the completion of the product, especially those parts that may not be fully cured through the radiation process. Isolation of the partially cured product is thus difficult and may distort the parts of the product that is not self-supporting in a gravitational field.

There exist various methods for the isolation of plastic products. However, the existing methods are limited to the use of reactive dyes in hydrogels with an organochlorine compound (e.g., trichloroacetic acid, trichloroethanol, etc.) which is activated by radiation. Further, the density separation has been extensively applied in mineral enrichment and occasionally as a way to classify mixed plastic particles in waste or environmental samples and is not found in any manufacturing processes.

Thus, in light of the above-mentioned limitations, there is a need for a method that isolates the plastic product produced by the polymerization of resin with proton beams. In addition, there is a need for a method that uses reactive dyes in the liquid resin, which change color when activated by the proton beam or the chemical polymerization process.

SUMMARY

The present invention generally discloses a method for isolating plastics. Also, the present invention discloses a method of isolating plastic products produced by polymerization of resin with proton beams. Further, the present invention discloses a method for isolating plastic parts formed in situ of the liquid resin by introducing a dense immiscible liquid to displace the residual liquid resin.

According to the present invention, a method of isolating plastic products produced by polymerization of resin with proton beams is disclosed. In one embodiment, a reactive dye is added to the liquid resin that changes from transparent or colorless to color when activated by the proton beam or the chemical polymerization process to reveal polymerization within a polymerizable resin. In one embodiment, the polymerizable resin is an acrylic resin. In one embodiment, the polymerizable resin reacts by a free radical or ionic mechanism. In one embodiment, the change in color is correlated to the energy delivered to the resin by a proton beam, electromagnetic radiation, or heat. In one embodiment, the reactive dye is leuco-crystal violet (LCV).

In another embodiment, a method for isolating plastic parts or partially polymerized resin from residual liquid resin involves a density segregation process in an inert liquid density gradient. In one embodiment, the density segregation is performed by introducing a dense immiscible liquid. In one embodiment, the dense immiscible liquid is used to displace the residual liquid resin. In one embodiment, the dense immiscible liquid is a solution of an inorganic salt in water. In one embodiment, the density gradient is provided by an aqueous salt solution. In one embodiment, the liquid resin is displaced with the aqueous salt (i.e., sodium chloride) solution that has a density greater than the density of the liquid resin and slightly less dense than the partially cured resin. In one embodiment, the liquid resin has a density of about 1.05 g/mL. In one embodiment, the fully cured product has a density of about 1.17 g/mL. In one embodiment, the partially cured resin has a density of about 1.10 g/mL.

In one embodiment, the liquids are in contact as the product is formed in the resin phase and are frozen during the formation of the product in situ, and the low-density organic solvent is placed atop an aqueous solution to expedite the separation of organic liquids. In one embodiment, once the liquid is separated, the partially cured product is supported by the salt solution and is cured to final hardness in the aqueous solution by ultra-violet (UV) light or heat or a chemical curing agent. In one embodiment, the residual resin recovered from density gradient separation is recycled or reused.

In one embodiment, the method further involves a proton beam energy storage mechanism to detrain the radiation absorbed using a container. In one embodiment, the container comprises a stable matrix with a proton beam. In one embodiment, the matrix is gelatin, wax, or resin that may be free-standing or contained in a transparent plastic container. In one embodiment, the container is a tube or a box of any desired dimensions or shape. In one embodiment, the container includes a graduated marking along the sides to readily determine the extent and location of any color change in the matrix. In one embodiment, there may be inclusions within the matrix material to provide reference points.

In one embodiment finely divided zinc sulfide with or without an activating agent such as Ag or Au doping is suspended in the resin in order to generate short wavelength (less than 400 nm) electromagnetic radiation by scintillation when struck by high energy protons to activate the resin to polymerization.

In one embodiment, the proton beam deposits energy at a Bragg peak within the matrix. In one embodiment, the volume affected by the energy deposition causes activation of one or more redox indicators. In one embodiment, one or more redox indicator is incorporated into a stable matrix such as gelatin, wax, or resin that may be free-standing or contained in a transparent plastic container. In one embodiment, the redox indicator produces a color change. In one embodiment, the device further produces a graph showing the two-dimensional concept of energy deposition along the beam. In one embodiment, the graph includes an indication of the threshold level to produce a viewable or noticeable change in the redox indicator. In one embodiment, the redox indicators include but are not limited to N-Phenylanthranilic acid, o-Dianisidine, Diphenylbenzidine, Diphenylamine, and Viologen.

In one embodiment, quantitative absorption spectroscopy is applied to the free-standing or containerized matrix after visualization of the redox indicator to determine the dose of radiation absorbed along any line of incidence. In one embodiment, from these data, a digital three-dimensional image of the disposition of the absorbed dose is developed and quantitative micro-doses are assigned to each voxel in the matrix.

The above summary contains simplifications, generalizations, and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

In one embodiment, a method of isolating plastic products produced by polymerization of resin with proton beams is disclosed. In one embodiment, a reactive dye is added to the liquid resin that changes from transparent or colorless to color when activated by the proton beam or the chemical polymerization process to reveal polymerization within a polymerizable resin. In one embodiment, the polymerizable resin is an acrylic resin. In one embodiment, the polymerizable resin reacts by a free radical or ionic mechanism. In one embodiment, the change in color is correlated to the energy delivered to the resin by a proton beam, electromagnetic radiation, or heat. In one embodiment, the reactive dye is leuco-crystal violet (LCV).

For example, an acrylic resin containing less than 0.5% leuco-crystal violet dye (LCV) is placed into a plastic container and frozen. In one embodiment, a proton beam is directed into the container to polymerize the resin. As the resin is polymerized, the dye in that region changes from colorless to blue and purple as the absorption at 590 nm becomes progressively more intense. In one embodiment, when irradiation is complete, the container of frozen (i.e., immobile) resin is opened at the top and bottom and placed on the top of the column of water containing a density gradient provided by dissolved salt. In one embodiment, the salt has a density of about 1.20 to 1.00 g/mL. In one embodiment, as the liquid resin melts, it floats on top of the density gradient. In one embodiment, the liquid resin has a density of about 1.05 g/mL. In one embodiment, the container separates and sinks to the bottom of the salt gradient. In one embodiment, the container has a density of about 1.5 g/mL. In one embodiment, the partially cured resin is suspended in an essentially weightless state in the density gradient. In one embodiment, the partially cured resin has a density typically of about 1.10 to 1.15 g/mL. In one embodiment, the partially cured product is then subjected to a beam of ultra-violet (UV) radiation that effectively completes the cure to a rigid solid that sinks lower in the density gradient. In one embodiment, the rigid solid has a density of about 1.16 g/mL.

Figure 1:
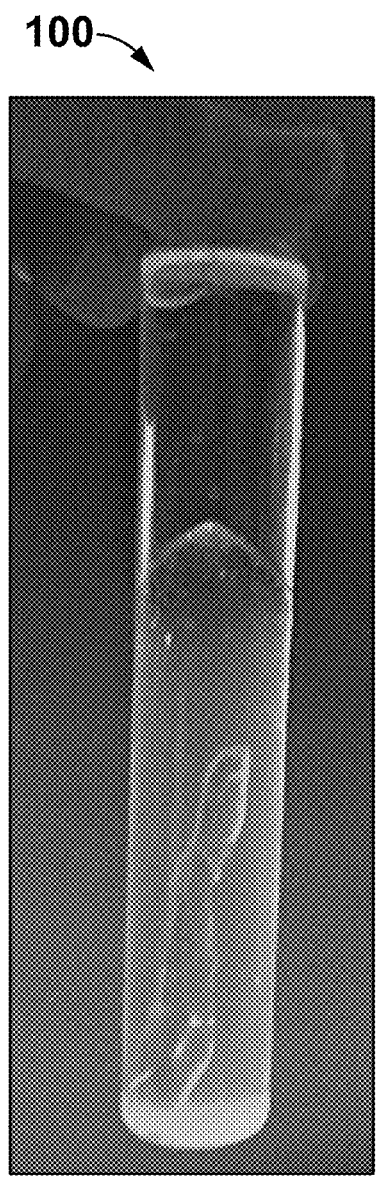
FIG. 1 shows a photograph of a sample of cured resin suspended in a salt solution with the displaced liquid resin in an embodiment of the present invention.

Referring to FIG. 1, a photograph 100 of a sample of cured resin suspended in a salt solution with the displaced liquid resin is illustrated. In one embodiment, the photograph 100 illustrates a method for isolating plastic products formed in situ of the liquid resin by introducing a dense immiscible liquid to displace the residual liquid resin. The liquid resin is isolated by density segregation in an inert liquid density gradient. In one embodiment, the density segregation is performed by introducing a dense immiscible liquid. In one embodiment, the dense immiscible liquid is used to displace the residual liquid resin. In one embodiment, the dense immiscible liquid is a solution of an inorganic salt in water. In one embodiment, the density gradient is provided by an aqueous salt solution. In one embodiment, the liquid resin is displaced with the aqueous salt (i.e., sodium chloride) solution that has a density greater than the density of the liquid resin and slightly less dense than the partially cured resin. In one embodiment, the liquid resin has a density of about 1.05 g/mL. In one embodiment, the fully cured product has a density of about 1.17 g/mL. In one embodiment, the partially cured resin has a density of about 1.10 g/mL.

In one embodiment, the liquids are in contact as the product is formed in the resin phase and are frozen during the formation of the product in situ, and the low-density organic solvent is placed atop an aqueous solution to expedite the separation of organic liquids. Once the liquid is separated, the partially cured product is supported by the salt solution and cured to final hardness in the aqueous solution by UV light or heat or a chemical curing agent. In one embodiment, the residual resin recovered from density gradient separation is recycled or reused.

Figure 2:
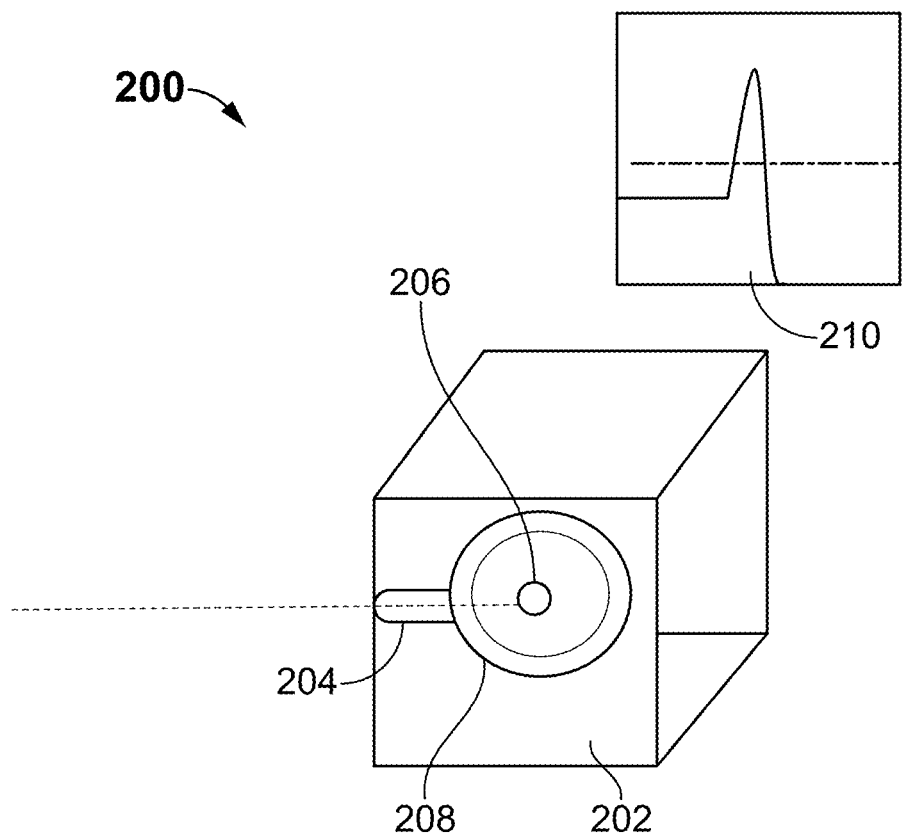
FIG. 2 shows a proton beam energy deposition mechanism in one embodiment of the present invention.

Referring to FIG. 2, a method 200 of a proton beam energy storage process using a container is illustrated. In one embodiment, the container comprises a stable matrix 202 with a proton beam 204. In one embodiment, the matrix 202 is gelatin, wax, or resin that may be free-standing or contained in a transparent plastic container. In one embodiment, the container is a tube or a box of any desired dimensions or shape. In one embodiment, the container includes a graduated marking along the sides to readily determine the extent and location of any color change in the matrix 202. In one embodiment, there may be inclusions within the matrix material to provide reference points.

In one embodiment, the proton beam 204 deposits energy 206 within the matrix 202. In one embodiment, the volume affected by the energy 206 deposition causes activation of one or more redox indicators 208. In one embodiment, one or more redox indicator is incorporated into a stable matrix such as gelatin, wax, or resin that may be free-standing or contained in a transparent plastic container. In one embodiment, the redox indicator 208 produces a color change. In one embodiment, the device further produces a graph 210 showing the two-dimensional concept of energy deposition along the beam. In one embodiment, the graph 210 includes an indication of the threshold level to produce a viewable or noticeable change in the redox indicator 208.

In one embodiment, the redox indicators 208 are compounds that change color (i.e., the wavelengths of light absorbed) upon adding or removing electrons. For example, the redox indicators 208 that are particularly relevant here are composed of only low atomic number elements (C, H, N, O) but all redox indicators 208 are potentially useful. In one embodiment, the avoidance of high atomic number elements is to avoid secondary radiation (x-rays) that might be produced with higher atomic number elements. In one embodiment, the redox indicators 208 include, but are not limited to, N-Phenylanthranilic acid, o-Dianisidine, Diphenylbenzidine, Diphenylamine, and Viologen. The various types of redox indicators 208 are listed in the below table-1.

| Indicator | $E^0$, V | Color of Oxidized form | Color of Reduced form |
|---|---|---|---|
| N-Phenylanthranilic acid | +1.08 | violet-red | colorless |
| o-Dianisidine | +0.85 | red | colorless |
| Diphenylbenzidine | +0.76 | violet | colorless |
| Diphenylamine | +0.76 | violet | colorless |
| Viologen | −0.43 | colorless | blue |

In one embodiment, quantitative absorption spectroscopy is applied to the free-standing or containerized matrix 202 after visualization of the redox indicator 208 to determine the dose of radiation absorbed along any line of incidence. From these data, a digital three-dimensional image of the disposition of the absorbed dose is developed and quantitative micro-doses are assigned to each voxel in the matrix 202.

The invention is further explained in the following examples, which however, are not to be construed to limit the scope of the invention.

EXAMPLES

While it is believed that one of skill in the art is fully able to practice the invention after reading the foregoing description, the following examples further illustrate some of its features. As these examples are included for purely illustrative purposes, they should not be construed to limit the scope of the invention in any respect. In the descriptions in the following examples, the numbers represent weight ratios in parts, unless otherwise specified.

Example—1: Use of Leuco-Crystal Violet (LCV) to Investigate Chemical Reactions

The leuco-crystal violet (LCV) is used to investigate reactions of a commercial acrylic resin. The acrylic resin is transparent in the visible range, but absorbs strongly below 400 nm and significantly above 970 nm. Further, the acrylic and methacrylic esters have strong absorptions in the UV at around 200 nm and in the near-IR at around 1150 nm. The polymerization (curing) of the resin is induced by UV radiation or heat. Under either condition, the LCV dissolved in the resin is converted to a CV that absorbs strongly at 590 nm producing a blue color.

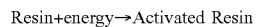

Resin+energy→Activated Resin

Activated Resin+LCV(colorless)→CV(Blue-Violet)

This reaction is used to investigate the formation of activated species that presumably are intermediates in the polymerization reaction near ambient temperature. The photons of UV radiation below 400 nm carry greater than 300 kJ/mole and presumably easily rupture the C=C pi bond (<270 kJ/mole) to form free radicles. The activation energy for the thermal reaction (−16 to +40° C.) is determined to be only 116 kJ/mole with a frequency factor on the order of 1020. The very high-frequency factor points to an electronic transition (rather than a vibrational mode) considered as the initiating step in polymerization at ambient temperatures. The observed activation energy of 116 kJ/mole corresponds to a wavelength of about 1032 nm which is on the high-energy shoulder of the near-IR absorptions of acrylic and methacrylic esters. This transition is presumably from the highest occupied pi orbital to the lowest unoccupied pi-star orbital of the conjugated C=C—C=O system.

The acrylic resins slowly "degrade" (polymerize) at ambient temperature. The reaction mechanism for polymerization of acrylic and methacrylic resins is recognized as free radical, while cyanoacrylates are base-catalyzed ionic. For example, one group found activation energies in the range of only 9 to 13 kcal/mole, which is obviously far less than that involved in the "cool and dark conditions."

The formation of free radicals under storage conditions includes the use of leuco-crystal violet (LCV) dye, which changes from colorless to blue-violet crystal violet (CV, absorbing at 590 nm) when it is activated by the abstraction of a hydrogen atom from the central carbon. The overall mechanism appears to be:

Resin→Resin Radical(slow)

Resin Radical+LCV→Resin Radical-H+CV(fast)

This mechanism allows us to directly examine the formation of free radicals under ambient conditions (dark and cool).

All experiments reported here employed a commercial resin identified by the manufacturer (YRYM HT) only as "YRYM HT UV Resin Hard Type" sold online for the formation of false fingernails. Manufacturer recommends curing with a 36-watt UV lamp at 365 nm for three minutes. Using proton NMR, it is determined the commercial resin is a mixture of monomers (n-butyl methacrylate and 2-ethylhexyl acrylate in mole ratio 1.75 to 1.00, respectively) with polyacrylic acid (mole ratios methacrylate monomer: 0.74, acrylate monomer: 0.41, polymer: 1.00). The resin also had a small amount (e.g., 100 ppm, 0.01%) of the methyl ether of hydroquinone (MEHQ) as a stabilizer. The acrylic resin is transparent in the visible range, but absorbs strongly below 400 nm, significantly above 970 nm, and strongly at 1200 nm (i.e., the longest observable wavelength). The density of resin is 1.05 g/mL.

The Leuco-crystal violet is a light-yellow powder (i.e., tiny crystals) obtained from Dawn Scientific Inc. The tiny crystals form a stable (i.e., non-settling) suspension in the resin and dissolve slowly maintained at 25° C. in the dark. Upper solubility limit is around 0.5 mass percent (i.e., a few small crystals persisted when it was attempted to produce that concentration). The most convenient method to make solutions is to make a uniform suspension of the tiny crystals in the resin and then dilute aliquots to the final concentration. When diluted, the dispersed crystals dissolved within 24-36 hours at which point the solution was faintly blue. The typical concentrations of LCV used in the experiments were 0.5 to 0.1% w/w (at least 10× the amount of MEHQ).

The reaction is followed by measuring the change in absorption at 590 nm (crystal violet) with a spectrophotometer (range 350-1020 nm), which is calibrated by setting the transmission of a sample of the resin at 590 nm at 100%. Thermally controlled experiments are conducted in a water bath+1-1° C. protected from light. To the extent possible, all manipulations involving resin were conducted in the very dim light from "soft white" (2700 K) light bulbs. Herein, aluminum foil is used to cover plastic containers.

Example—2: Results—Reaction in Response to Irradiation at 350 nm

The qualitative observations are made at several wavelengths in preliminary experiments at ambient temperature using the 0.50% stock solution (as shown in below Table 2):

TABLE 2

Reaction at Various Wavelengths

| LCV Concentration | Initial Absorption At 590 nm | k = Rate/[LCV] (ΔAbs/min [LCV]) | | |
|---|---|---|---|---|
| | | Irradiation At 450 nm | Irradiation At 400 nm | Irradiation At 350 nm |
| Absorption of Resin at Wavelength | | 0.592 | 0.985 | 3.000 (complete) |
| 0.50% | 0.735 | ≈ +0.0002 | | |
| 0.50% | 0.746 | | +0.014 | |
| 0.50% | 0.694 | | | +0.029 |

It is also determined that no detectable reaction occurred at ambient temperature in the dark immediately after the irradiation at 350 nm was interrupted (i.e., 5 minutes on then five minutes off). Based on these results, it was decided to dilute the 0.50% solution (i.e., to obtain fully dissolved solutions) and conduct more complete experiments at 350 nm.

Three samples of resin containing different concentrations of LCV were prepared and exposed to the 350 nm wavelength beam. This exposure was interrupted briefly (~10 s) at 2-minute intervals over a period of about 1 hour to measure the absorption at 590 nm (as shown in Table 3).

TABLE 3

Reaction when continuously irradiated at 350 nm

| LCV Concentration | Initial Absorption At 590 nm | Rate (ΔAbs/min) | k = Rate/[LCV] (ΔAbs/min [LCV]) |
|---|---|---|---|
| 0.50%* | 0.694 | +0.0145 | 0.029 |
| 0.23% | 0.525 | +0.0071 | 0.031 |
| 0.11% | 0.358 | +0.0029 | 0.026 |

These sample includes some crystalline particulates in a homogeneous suspension. The crystalline particulates are dissolved when the stock solution is diluted to 0.23%. The rate of color formation is apparently first order in LCV, but zero-order in acrylic resin under these conditions.

Example—3: The Dark Reaction

Some reactions proceeded even in the dark at ambient temperature. Thus, experiments were carefully shielded from light, run at controlled temperatures (−16, 4, 25, 32, and 40° C.) and different concentrations of LCV (0.18% and 0.11%). Over weeks, no detectable reaction was observed at −16° C., and reaction at 4° C. was not experimentally significant.

Figure 3:
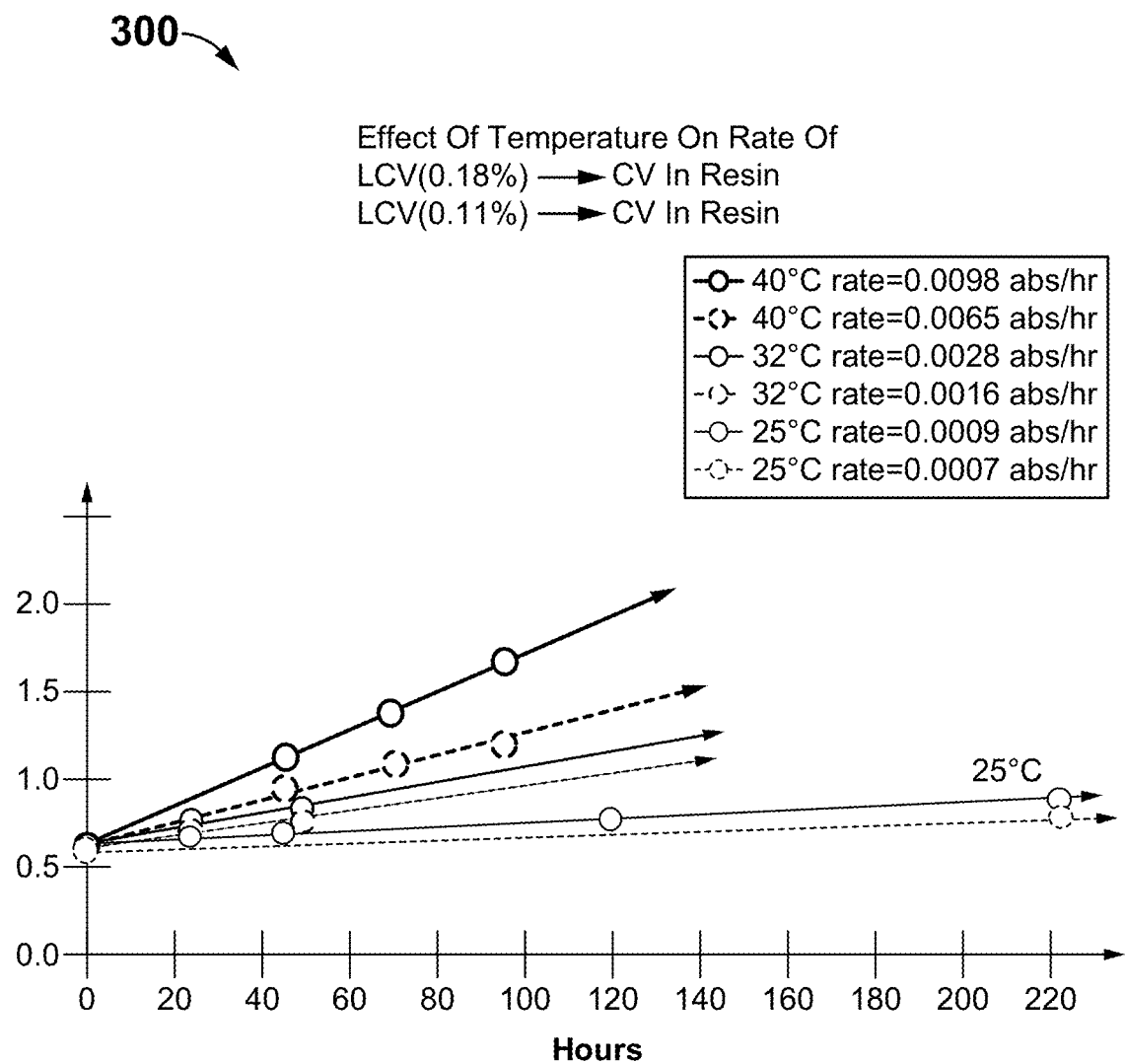
FIG. 3 shows a graph illustrating the effect of temperature in one embodiment of the present invention.
Figure 4:
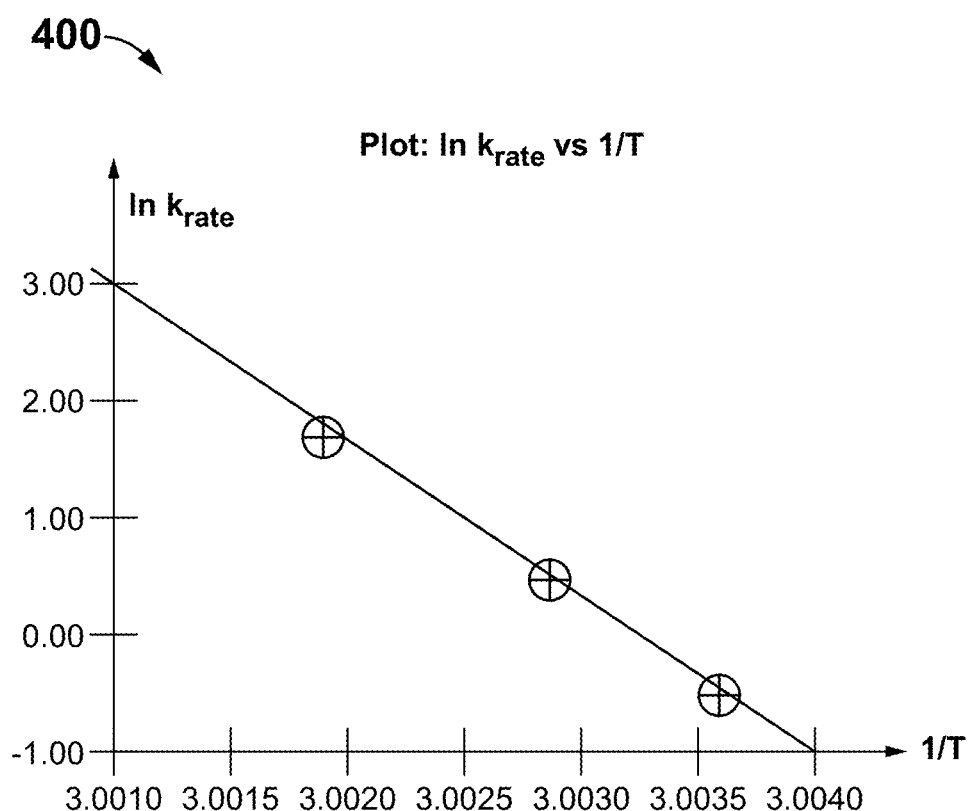
FIG. 4 shows a graph illustrating the Arrhenius data in one embodiment of the present invention.

Referring to FIGS. 3-4, a graph 300 showing the effect of temperature and Arrhenius data graph 400 are illustrated, respectively. The dark reaction is dependent on temperature and the development of the blue color is first order in [LCV]. The graph 300 describes the effect of temperature on the rate of LCV [0.18%] and LCV [0.11%] against hours. At 25° C. rate, the first order absorption is 0.0009 abs/hr. At 25° C. rate, the second order absorption is 0.0007 abs/hr. At 32° C., the first order absorption is 0.0028 abs/hr. At 32° C. rate, the second order absorption is 0.0016 abs/hr. At 40° C. the first order absorption is 0.0098 abs/hr. At 40° C. rate, the second order absorption is 0.0065 abs/hr.

Arrhenius data graph 400 is illustrated in a plot $K_{rate}$ in temperature Vs. 1/T. The plot is estimated using the following equation:

$$K_{rate} = Ae^{-Ea/RT}$$

$E_a$ represents 116 KJ/mole Activation energy. The Arrhenius is calculated using:

$$\ln A = \ln K_{rate} + Ea/RT$$

$\ln A = 1.69 + 116$ kJ/mole/(8.31 J/mole ° K) (313° K) = 46. A ~$10^{20}$ frequency factor. The slope is calculated using the following equation:

$$\text{Slope} = dy/dx = (-2.38/0.00017) = -14000 = -Ea/R$$

The LCV value increases as the temperature (i.e., $K_{rate}$) increases (as shown in FIG. 4). The value of the Arrhenius data at varying temperatures (as shown in Table 4).

TABLE 4

Arrhenius Data

| Temperature (° K.) | 1/T | $k_{rate}$ (0.18% LCV) | $\ln k_{rate}$ (0.18% LCV) |
|---|---|---|---|
| 313 | 0.00319 | 5.44 | 1.69 |
| 305 | 0.00328 | 1.50 | 0.41 |
| 298 | 0.00336 | 0.50 | −0.69 |

Example—4

In the UV-driven reactions, the initiating event is likely a unimolecular electronic transition in the conjugated pi system producing a diradical. The diradical could be either ·C—C·, ·C—O— or ·C—C═C—O.

For reactions that involve changing the bond lengths within molecules, the frequency factor is typically between 1014 to 1013 corresponding to the frequency of vibrations of molecules. A frequency factor (e.g., $10^{20}$) greater than $10^{15}$ suggests that the activation reaction involved an electronic transition occurring faster than the molecule vibrates. The high activation energy (116 kJ/mole) suggest a major bond-disrupting event. Thus, the initiating event in the dark reactions is possibly a resonance transition of the conjugated acrylate double bond:

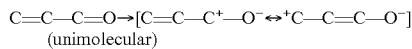
(unimolecular)

Ground State→Excited States

Which results in polymerization or proceed in a side reaction (hydride or proton transfer) from LCV to yield CV:

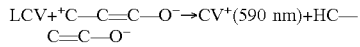

The 116 kJ/mole corresponds to a wavelength of light of 1032 nm. The acrylic and methacrylic esters have absorptions in the near-IR (NIR) typically in the range of 1100-1200 nm. The high-frequency factor is also interpreted as combinations of stretching and bending vibrations produced as the molecule changes resonance forms.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A method for isolating plastic products produced by polymerization of a liquid resin with proton beams, comprising the step of:
    adding the liquid resin to a container,
    adding reactive dyes into the liquid resin in a container, and
    directing proton beams into the container to polymerize the liquid resin, wherein the proton beams deposit energy at a Bragg peak within the matrix, thereby the reactive dye changes from transparent or colorless to color while the resin is cured by the proton beams,
    wherein the change in color is correlated to the energy delivered to the resin.

2. The method of claim 1, wherein the polymerizable resin is an acrylic resin.

3. The method of claim 1, wherein the reactive dye is leuco-crystal violet (LCV).

\* \* \* \* \*